Oct. 17, 1961 C. F. MATTKE 3,005,055

TILTING DIAL CIRCUIT SELECTOR

Filed Oct. 8, 1957 4 Sheets-Sheet 1

INVENTOR
C. F. MATTKE
BY Harry C. Hart
ATTORNEY

INVENTOR
C. F. MATTKE
BY Harry C. Hart
ATTORNEY

TILTING DIAL CIRCUIT SELECTOR

Filed Oct. 8, 1957 4 Sheets-Sheet 3

INVENTOR
C. F. MATTKE
BY Harry C. Hart
ATTORNEY

Oct. 17, 1961 C. F. MATTKE 3,005,055
TILTING DIAL CIRCUIT SELECTOR
Filed Oct. 8, 1957 4 Sheets-Sheet 4

INVENTOR
C. F. MATTKE
BY Harry C. Hart
ATTORNEY 3,005,055
Patented Oct. 17, 1961

3,005,055

TILTING DIAL CIRCUIT SELECTOR

Charles F. Mattke, Fanwood, N.J., assignor to Bell Telephone Laboratories, Incorporated, New York, N.Y., a corporation of New York Filed Oct. 8, 1957, Ser. No. 688,929
12 Claims. (Cl. 179—90)

This invention relates to electrical circuit selectors and more particularly to electrical circuit selectors suitable for telephone station signaling.

Numerous efforts have been made in the past to simplify the construction and improve the operation of electrical circuit selectors of the type used for establishing telephone voice connections. In many of these the rotary impulse sending mechanism, commonly known as the "dial" and widely used in telephone practice, is replaced by structures using push-buttons and key-operated levers. This expedient to some extent avoids the difficulties which frequently arise in the operation of dial mechanisms, of which the most common is the dialing of a wrong number by the subscriber himself in his hurry to establish a connection and complete a call. This may come about not only by the inadvertent selection of the wrong dial opening entirely, but also by the finger of the subscriber slipping out of the dialing hole and into another, or slipping out of the dial hole altogether prior to the time that his finger engages the dial stop.

While push-button arrangements in large measure overcome these objections, difficulties are encountered in their use which are almost of as great import as those experienced with the usual rotating dial. For example, a typewriter-like arrangement of buttons is strange in appearance and can create confusion in the mind of the ordinary subscriber familiar only with the conventional dial arrangement. Consequently, it is preferable insofar as possible to retain the well-known and universally accepted circular arrangement of dial holes in a push-button selector. Similarly, in using a push-button arrangement for selecting a channel identified by a long sequence of numerals, it is very easy for the subscriber to depress simultaneously two or more buttons. As a result, relatively complex mechanical or electrical interlocking devices employing either rotating or sliding contactor elements must be used to avoid this danger. Aside from a rapid deterioration of these parts, such arrangements substantially increase both the required length of stroke of the push-button lever arms and the applied pressure necessary to make a positive contact.

It is the principal object of the present invention to overcome the difficulties previously encountered in electrical circuit selectors of this type and to simplify the construction and generally improve the operation of such selectors.

It is another object of the invention to minimize the time and effort required for the selection of one electrical circuit from among a large group of circuits, each identified by a sequence of numerals.

It is still another object of the invention to preserve, in a positive-action, push-buttonlike selector, the conventional circular "dial" appearance so well known throughout the world.

More specific objects of the invention are to reduce the physical dimensions of a push-buttonlike circuit selector so that it may be used either to replace a conventional rotary dial of the type employed in existing telephone equipment, or to be integrated in new miniature equipment, and to materially reduce the probability of errors occurring in the selection of a circuit identified by a sequence of numerals which may arise from inaccurate finger positioning during the selection process.

Push-buttonlike selectors arranged in the accepted circular "dial" configuration have previously been described. One of these, disclosed in H. M. Bascom Patent 2,190,307, granted February 13, 1940, comprises an operating "dial" plate member pivotally mounted and resiliently held in a normal position from which it may be tilted when manual pressure is applied thereto by an operator. The tilting movement produces the transmission of currents representing portions of a selected telephone designation in correspondence to the direction of the tilt. The plate member of the selector has a universal tilting movement, but is nevertheless provided with a mechanical detent to restrict the tilting motions to a limited number of preassigned numeral designation directions in order to insure first, that a contact actually is made in response to a sufficient tilting motion, and second, that pressure on a designated portion of the tilting plate invariably establishes the corresponding circuit. As a result of the restricted tilting action of the plate, sufficient finger pressure must be applied carefully to the center of the immediate numeral designation area corresponding to the direction of tilt permitted by the detent in order to effect the contact. Otherwise no contact is made, or a wrong contact is made.

In accordance with the present invention and in furtherance of its various objects, this and the many other difficulties previously encountered in the construction and operation of non-rotatable electric circuit selectors are overcome by the use of a circular designation plate or disc, bearing a series of designation numerals or marked areas for respectively identifying a number of independent electrical circuits, mounted in a fashion such that it may be tilted, without rotation in any direction in response to applied finger pressure and against the restoring force of a spring. So long as the finger is applied closer to the center of one of the marked areas than to the center of any other, the resulting tilt of the plate is such that the terminal corresponding to the marked area is engaged thereby invariably to establish the selected circuit. Unlike selector devices encumbered with complex detent devices which restrict the tilt to one of a preassigned number of possible angles, an initial error in positioning the finger or a change in direction of applied pressure at any time during the tilt of the plate prior to the completion of a contact does not prevent the desired contact from being established nor does it increase the likelihood of the establishment of a wrong contact.

The marked areas on the movable plate may, for example, resemble a series of push-buttons uniformly spaced around an arc, preferably a large fraction of a full circle. The underside of the disc bears a continuous ring of an electrical conducting material. A number of electrical terminals associated with the respective independent circuits are disposed in circular fashion on a base mounted below the ring. When external pressure is applied to one of the marked areas on the upper face of the disc, the entire disc tilts about an axis perpendicular to the diameter extending through that numeral designation, and the conductive ring correctly makes contact with that one or group of terminals situated directly below it corresponding to the indicated numeral.

In normal telephone use, the subscriber depresses successively the numeral designation areas on the selector which correspond to each of the characters included in the directory number assigned to the party being called.

A feature of the invention is a detentless construction in which the designation plate is free to tilt in any direction and in which the orientation of the axis of tilt is both stabilized and quantized regardless of the orientation of the axis prior to the engagement of the contactor ring with a particular terminal. By the term "quantized," it is meant that despite a considerable error, less than one-half of the space between adjacent numerals, made in applying the finger to the designation plate, the plate still tilts in the proper direction, i.e., about the correct tilt orientation axis, to engage the desired terminal. By the term "stabilized" it is meant that once the tilt has progressed far enough for the desired terminal to be engaged, a firm and stable contact is established. Hence notwithstanding a continued error in the point or direction of the application of pressure, there is no tendency for the plate to deviate from the tilted position. It is advantageously urged to the correct orientation axis thus assuring the ultimate selection of the correct circuit.

In one embodiment a single terminal is associated with each external circuit and identified by a corresponding numeral on the upper face of the designation plate. Simultaneous engagement of the ring with more than one such terminal at any instant is prevented, even though the applied pressure is not perfectly centered on the numeral designation point, by the provision of insulating means located between each pair of the terminals. In another embodiment two or more terminals are associated with each numeral designation, and the desired connection preferably is made only when the designation plate is so tilted that the contactor ring engages two adjacent terminals simultaneously. Accordingly, each designation numeral on the upper face of the disc is located above the midpoint of an adjacent pair of terminals. The angle of tilt is consequently stabilized and quantized once the disc has been so far tilted that it engages two adjacent pins. An error in positioning the finger means only that the conducting ring engages one of these pins before it engages the other. The ring is immediately driven home to engage both desired pins provided only that the error in locating the finger is less than one-half the spacing between the adjacent terminals. With either of these arrangements the selection of more than one circuit at a time is made inherently impossible so that the need for complex interlocking mechanisms is obviated.

A particularly desirable feature of the invention is the simplicity of mechanical construction which makes the selector manifestly suitable for use in applications in which physical compactness is essential. It need comprise only a supporting plate or disc with an associated conductor ring, a pivot and a series of terminals. The unit is ideally suited for use as a substitute for the conventional rotary dial in a modern lightweight telephone handset. As a result of its compactness it may be mounted either coaxially with the microphone unit or in any one of a number of positions in the hand support member itself. In another form the circuit selector is readily interchangeable with a conventional dial mechanism mounted on the cradle or supporting member of a telephone terminal unit. In those applications in which the diameter of the tiltable designation plate must be suitably small, the numeral designation marks are arranged to occupy either the periphery of the plate or the adjacent support area surrounding the plate. By this expedient the designation numerals may be made of moderate size and yet are easily readable.

Coupled with a reduction in size and complexity of the selector is an advantageous reduction both in the length of stroke and in the amount of finger pressure required to produce a tilting motion sufficient to establish a contact. These reductions materially reduce the time and effort expended by a subscriber in completing a call.

Still another feature of the invention resides in a simplified biasing arrangement which provides both a physical and an audible indication of the fact that a desired contact has been made. With a designation plate of moderate size which is free to move in any direction, the stroke required to effect a contact is on the order of but a few degrees of tilt. Consequently, it may be difficult for a subscriber to know whether or not sufficient tilt has been produced to make a firm contact. According to the present invention the biasing arrangement comprises a prestressed tension member associated with the tiltable plate and characterized by a sharp break in its applied force versus displacement characteristic. As the plate is tilted in any direction, the force applied to the member produces displacement at a first rate below a predetermined threshold value and displacement at a second rate above the threshold. The transition from one condition to the other condition may be accompanied by an audible click or snap in addition to the perceptible change in the reaction of the restoring force. This "snap-action" provision serves two distinct functions; first, it insures that sufficient pressure is applied to make a contact and second, it decreases the likelihood of chatter by insuring a firm contact. Both materially aid in the establishment of a proper circuit.

Another feature of the invention is a greatly simplified device for producing an appropriate series of encoded current impulses arranged in uniform cadence as a direct consequence of the displacement of the designation plate in any given direction. The impulses are produced as a stylus member attached to the selector plate engages a code disc rigidly mounted to the selector housing. The code disc comprises an insulating base carrying on its surface a series of coded conductive stripes or depressions corresponding to the respective numeral designations. As the plate is tilted, the stylus sweeps across the coded surface of the disc thereby producing a series of circuit closures. An important advantage attained by this feature over prior art arrangements is the elimination of external multi-frequency or pulse generators with their bulky relays and vibrating reed mechanisms and, in addition, an added degree of quantization achieved by the appropriate arrangement of the conductive stripes on the code disc. Each of these further increases the probability of a correct selection of the desired circuit.

The foregoing and other features of the invention will be more fully apprehended from the following detailed description taken in connection with the appended drawings in which.

Figures 1, 2A, 2B, 2C, 2D, 3:
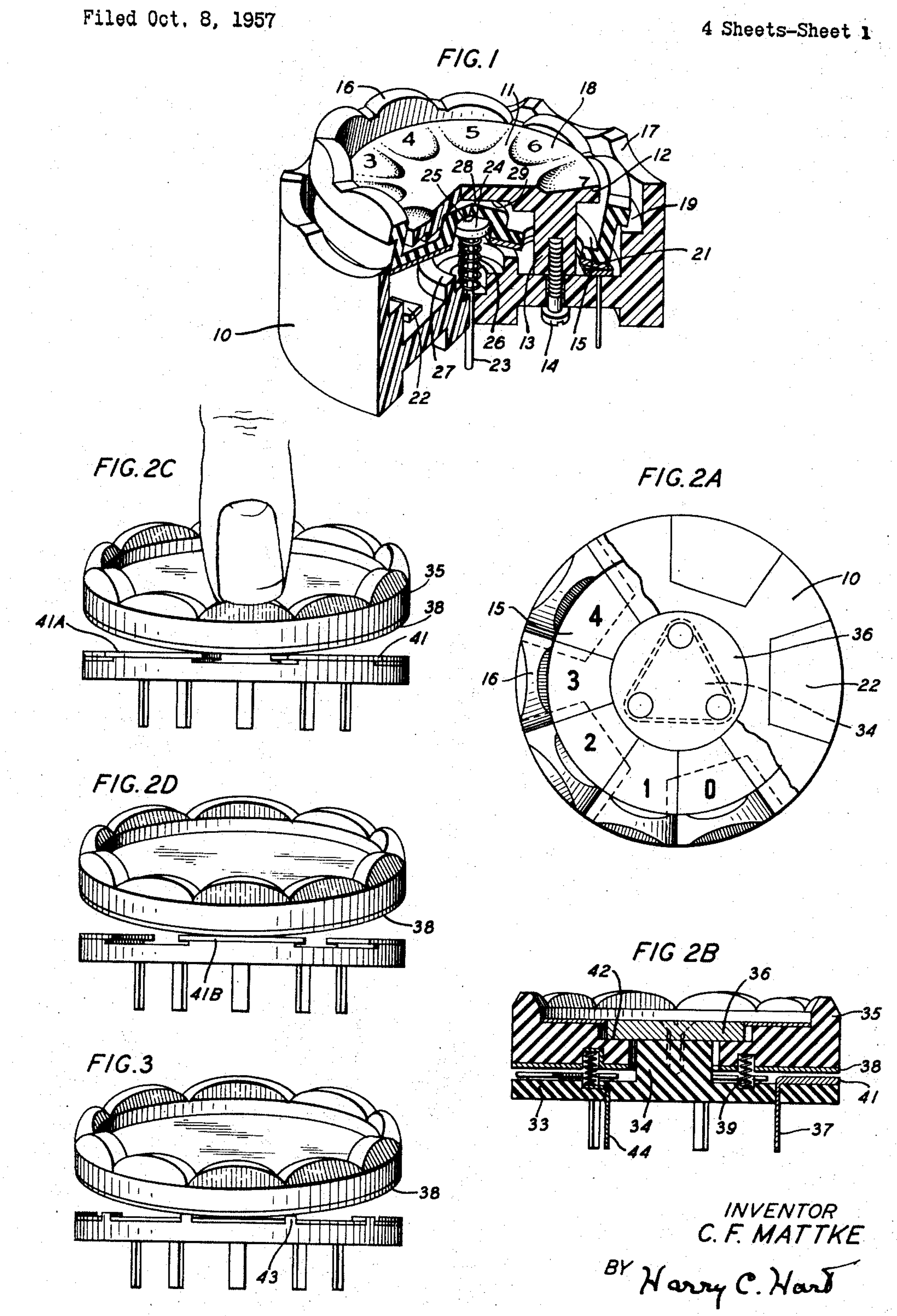
FIG. 1 is a perspective view, with certain parts cut away, of an electrical circuit selector in accordance with the invention.
FIG. 2A is a top view, partially in section, of a tiltable designation plate showing several numeral designation marks on the plate, and several terminals on the base below the plate.
FIG. 2B is a cross-sectional view of a circuit selector according to the invention in which the designation plate is at rest, or in the "no-contact" position.
FIGS. 2C and 2D are simplified perspective views of a selector with the designation plate shown in two different operating positions.
FIG. 3 is a simplified perspective view of a selector provided with an alternative terminal arrangement according to the invention.

Referring now to the drawings and in particular to FIG. 1, the movable and other cooperative elements of a circuit selector in accordance with the invention may, if desired, be mounted within the protective confines of a housing member 10. The housing member or base 10, which may be formed from any inert material such as a plastic, comprises a bed plate with cylindrical side portions extending upwardly therefrom. Mounted within the side portions is an inner support member 11 which has a circular table top-like platform or shoulder 12 extending around the periphery of its uppermost portion. Support member 11, which may be made of the same material as base 10, is rigidly affixed to the base by means of a number of legs 13 held, for example, by the screws 14. A freely movable designation plate 15 is positioned within the cylindrical walls of base 10 and held captive beneath the edge of platform 12. The plate 15 is of circular shape and provided with a number of openings corresponding to the legs 13 of the support member so that the plate is entirely free of contact with the support. The outer periphery of the plate 15 carries a plurality of discrete raised portions 16, one for each independent contact position to be accommodated by the selector. Around the periphery of the upper portion of the cylindrical side member are positioned a number of depressions 17 corresponding to the raised portions of the plate 15. A similar series of depressions 18 located in the upper surface of the support member 11 are oriented in juxtaposition to the depressions in the side portion of the housing. If desired, a series of designation numerals may be embossed, stencilled or otherwise printed within these depressions, or on bosses adjacent thereto to identify the individual points of depression. By this arrangement of depressions, the raised portions 16 of the plate 15 resemble discrete push-buttonlike protrusions within distinct finger guides. Hence, as the finger is applied to any portion of a raised portion 16 it is gradually guided by the pair of depressions to the correct position.

The underside of the movable plate 15 bears a continuous conductor ring 21 and the upper surface of the base portion of the housing 10 is provided with a number of independent terminals 22 suitable for connection to an external circuit. This ring 21 may be connected, if desired, to an external circuit. Any form of terminal may, of course, be employed. For purposes of illustration, the terminals 22 are shown as a number of conductor plates circularly arranged with the several contact surfaces in a plane.

Movable plate 15 is supported at its center by a shaft 23, journaled by an aperture in the base 10, provided with a bearing surface 24 at its upper extremity. This surface 24 engages a cup-shape depression 25 in the movable plate 15. A compression spring 26 forces the surface 24 on shaft 23 to engage cup 25 and maintain the plate 15 in its upwardly most operating position in the absence of any externally applied force. By virtue of a protuberance 28 located on the upper surface of the circular plate 15 at or near its center, and a corresponding socket 29 on the underside of the support member 11, a pivoting action occurs about a point in the peripheral surface of the socket 29 when pressure is applied to one of the raised portions 16 of the plate 15. Pressure in a generally downward direction on one of the raised button-like portions 16 causes the entire plate to tilt about a pivot point, in an orientation axis defined by the radius drawn through the center of the selected portion 16 at the corresponding point of contact of member 28 with socket 29. The shaft is, in turn, forced downward against the force of spring 26 until finger pressure is released. It then returns, in reciprocating fashion, to its rest position; the spring 26 bears against the surface 24 and the entire plate once again assumes its normal horizontal position. In a preferred form, the bearing surface 24 comprises an enlarged disc-shaped member in order to increase substantially the travel of the shaft in its up and down excursions, for reasons that will become apparent hereinafter. The shaft 23 and the journal box in base 10 through which it passes may, if desired, be provided with a controlled amount of sliding friction in accordance with any well-known technique in order to damp the return of the shaft and minimize contact chattering.

An annular shoulder or shelf 19 extending around the inside of the cylindrical side portion of the housing member 10 acts as a stop to prevent depression of the movable plate beyond a predetermined limit. Similarly, an annular protective ridge 27 on the base portion of the housing prevents engagement of more than one terminal by the disc should the entire plate be depressed. Rotation of the plate 15 is prevented by the legs 13 supporting the inner housing member 11 which extend through the several holes positioned in the movable plate. By virtue of this arrangement the movable plate 15 bearing the conductor ring 21 is free to tilt in any direction and yet can effect one and only one contact at any one time. The selector has in effect a built-in lock-out device which is free of the mechanical complexities of the lock-out mechanisms common to prior art arrangements. Thus, a small amount of applied pressure is sufficient to produce the equally small degree of tilt necessary to make a contact, and this pressure need not necessarily be applied in the exact center of the particular index position. To the contrary, pressure applied to the center of any raised portion or to any point on the raised portion which one-half of the spacing between adjacent portions is all that is required. Moreover, pressure applied to any two points on the plate that are separated by an equal distance from the center of the desired index position will establish the desired contact. For example, simultaneous pressure applied to index positions 4 and 6, or 3 and 7 will nevertheless close contact 5. Consequently, no matter how many index positions are simultaneously depressed only the resultant force is effective to close only one contact. Because of this unique operation, the conductor disc 21 may advantageously be sectionalized into several independent sectors each connected to an external circuit thereby to permit the selector to be used for matrix switching.

FIG. 2A is a top view, partially in cross-section, of a movable plate 15 which may be used in the selector of FIG. 1. The raised portions 16 at the periphery of the plate divide the circular plate into sectors each identified by a numeral designation or index mark. The relative position of the independent contactor terminals, illustrated here in the form of separated conductor plates 22, is shown in the cut-away portions of the plane view.

FIG. 2B is a cross-sectional view of the plate of FIG. 2A illustrating an alternative arrangement for supporting the movable plate. In this arrangement, the base member 33, shown here without the cylindrical side portions, has a centrally located pedestal or shank 34 of triangular shape having a circular portion 36 rigidly affixed thereto at its upwardly disposed surface. The movable plate 35 bearing the continuous conductor ring 38 at its lower surface is positioned by means of compression springs 39 to engage the lower surface 42 of the central disc 36. Independent conductor plates 41 are fixed to the upper surface of the base. Each is provided with an external conductor lead 37 and each is positioned beneath a selected index position. In the illustrated case, a conductor plate 41 is positioned below each even number position. Pressure applied to any one of these points causes the plate 35 to tilt about an axis perpendicular to a diameter extending through the center of the plate and the point of applied pressure. The bearing surface lies in a plane passing through this diameter perpendicular to the surface of the plate, and at the junction of the bearing surface of the movable plate 35 and a point on the undersurface 42 of the circular restraining disc 36. In the tilted position an electrical contact is established between the ring 38 and one or more of the terminals 41. The ring is conveniently connected to an external circuit through one or more of the springs 39 and a terminal 44. Upon release of applied pressure the movable plate is returned to its normal position by the springs 39 and is once again forced against the restraining disc 36 out of contact with any of the plates 41. Since the pedestal 34 is of triangular shape and the aperture in the center of the movable plate 35 is of similar shape, rotation is effectively prevented while a tilting motion in any direction is freely permitted.

According to the arrangement of FIG. 2A the conductor plates are separated by large insulating areas. Alternatively, the plates themselves may be raised above or recessed below the plane of surface of the base. Two forms of contact may be established by virtue of this arrangement; first, when the conductor ring 38 engages only one of the plates and, second, when the ring engages two adjacent conductor plates. These modes of operation are illustrated respectively in the greatly simplified FIGS. 2C and 2D. In FIG. 2C, for example, the conductor ring 38 is shown in engagement with two adjacent terminals 41 and 41A, and in FIG. 2D with only one terminal 41B. In the former mode of operation, the disc 38 need not, of course, be connected to an external circuit; it may serve merely to connect together adjacent terminals. The insulating gaps or islands between adjacent terminals, while permitting the movable plate to be "rolled" from one terminal to an adjacent one, effectively prevent two contacts from being produced simultaneously.

According to the embodiment of the invention illustrated in FIG. 3, one terminal is associated with each numeral designation position. To insure that only one terminal be engaged at any one time, and further to insure that finger pressure applied to any part of the raised portion of the movable plate, whether at the center or off center by as much as one-half the spacing between adjacent positions, will result in only one contact, a raised insulating member 43 is provided between each of the adjacent terminal plates. With this construction, an error in locating the finger means only that the conductor ring 38 engages one of the raised insulating portions before it engages the conductor plate. It is immediately driven home to engage the conductor plate thereby stabilizing the operation and producing a firm contact.

Figure 4A:
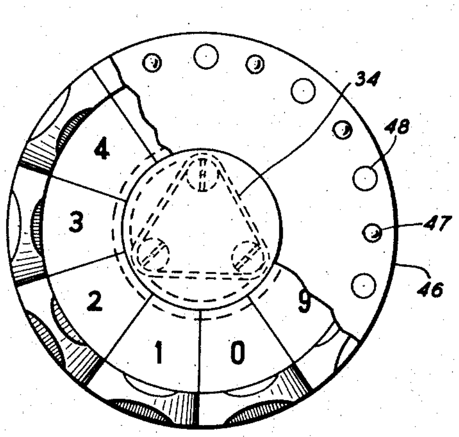
FIG. 4A is a top view, partially in section, of a selector according to the invention illustrating an alternative form of designation plate and terminal arrangement.

FIG. 4 illustrates another alternative form of the invention. The top view of a movable plate is shown in FIG. 4A with a cut-away portion provided to illustrate the arrangement of terminals on the base of the selector. These terminals, shown in the form of circular pins, are arranged around the periphery of the base member 46. Alternate pins 47 are located directly below the raised index points and are connected to external circuits. These are termed "active" pins. The remaining ones 48, that is, pins located between the active ones, are "inactive" and used only to stabilize the tilting action much in the manner of the insulating ridges of the selector of FIG. 3.

Figure 4C:
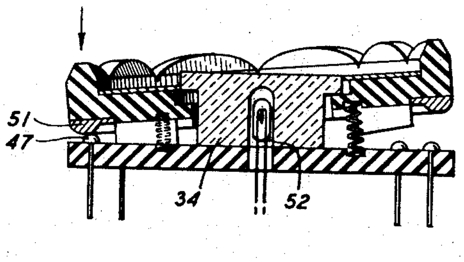
FIG. 4C is a cross-sectional view of the selector of FIG. 4A in one operating or "contact" position.
Figure 4B:
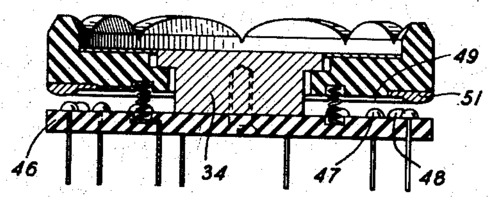
FIG. 4B is a cross-sectional view of the circuit selector of FIG. 4A with the designation plate shown in the rest or "no-contact" position.

In FIG. 4B the designation plate is illustrated in a cross-sectional view. The arrangement is similar to that of FIG. 3 in that a triangular pedestal 34 with a circular restraining disc is employed to restrict the rotation of the movable plate and to provide the necessary bearing surfaces for restricting tilt of the plate. The conductor ring 49 located on the underside of the movable plate contains a raised portion 51 at its periphery to provide a wiping contact with the terminal pins. This aids in cleaning the contacts.

In FIG. 4C the movable plate is illustrated in a tilted position. Here one of the pins 47 has been engaged by the raised edge 51 of the conductor disc. The insulating pins located between the active pins may, of course, equally well be in the form of ridges or other raised insulating members. Alternatively, the insulating members may be in the form of ridges formed on the underside of the movable plate. In this case appropriate apertures must be provided in the conductor ring 49. Also illustrated in FIG. 4C is a means for illuminating the designation numerals embossed in the upper surface of the movable plate. Accordingly, the pedestal member 34 is made of a light transmitting material, for example, one of the class of plastics known as "Lucite." A small electric lamp 52, energized from any convenient source, is positioned in close proximity to the pedestal. It is conveniently mounted within a recess in the base but, of course, may be mounted beneath the base or in any other convenient position. The numeral designation symbols are engraved in the surface of the plastic disc in such a fashion that light is transmitted through the member to appear only at the engraved designation points.

Figure 5B:
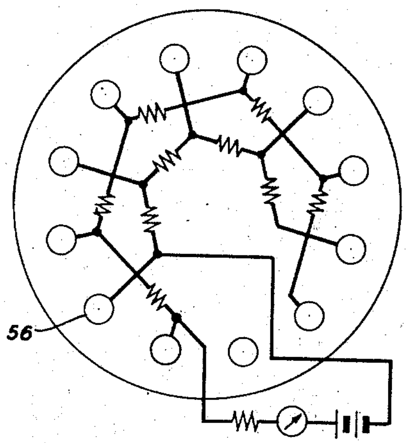
FIG. 5B is a circuit diagram showing, in plan, the electrical connections associated with the terminals of the selector of FIG. 5A.
Figure 5C:
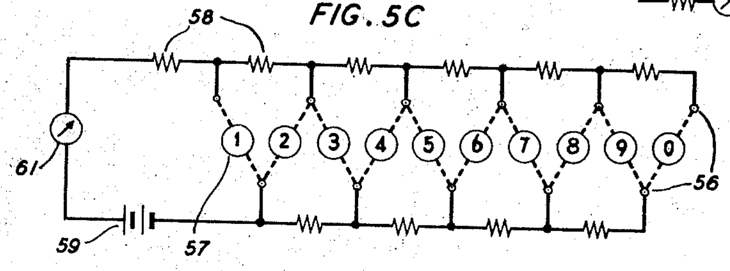
FIG. 5C is a conventional schematic diagram of the circuit illustrated in FIG. 5B.
Figure 5A:
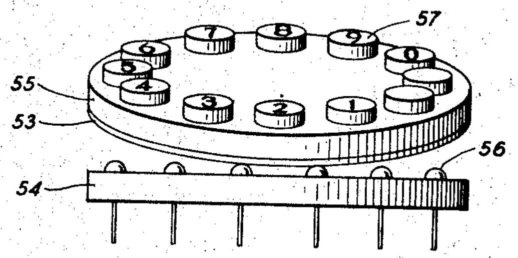
FIG. 5A is a simplified perspective view of still another terminal arrangement in accordance with the invention.

In FIG. 5A still another embodiment of the invention is illustrated. In this simplified view of a designation plate, the conductor ring 53 located on the underside of the movable plate 55 is similar to the ring employed in the selectors described heretofore. The base member 54 contains conductor pins 56 which are positioned at the mid points of adjacent push-button positions. There are no inactive terminals in this arrangement and an output pulse is produced by connecting together any two adjacent pins. Thus, the conductor disc on the underside of the movable plate need not, in this embodiment, be connected to an external circuit. Moreover, the insulating island or ridges previously described need not be employed between adjacent conductor pins. Tilt of the movable plate is both quantized and stabilized by virtue of the symmetrical arrangement of terminals. Once the plate has been so far tilted that it engages one pin it then rolls to one side or the other, depending on the direction and position of the applied force, and eventually engages a second pin. When the plate is in contact with two pins it is in a stable condition. Hence, an error in locating the finger on one of the designated pressure points or push buttons 57 only delays slightly the establishment of a contact since the plate engages one of the pins an instant before it engages the second. This does not produce a spurious signal but rather provides an additional element of pivoting so that the conductor ring is immediately forced to a stable position in contact with two terminals. Provided that the error in locating the finger is less than one-half of the spacing between the adjacent pins, the correct connection will always be made.

FIG. 5B is a schematic drawing in plan of the circuit connections which may be employed in connection with the selector of FIG. 5A. A conventional schematic of this arrangement is illustrated in FIG. 5C wherein the buttons 57 are shown bridging the respective adjacent terminals 56, by means of dashed lines. Depression of any button completes a circuit through the corresponding pair of terminals, one or more of the resistors 58, a battery 59, and an indicating device 61. The total resistance of a particular path associated with the corresponding button, and consequently the current available for energizing the indicating device, is a positive indication of the button depressed. Indicating device 61 may, of course, be a component part of an external system.

Figure 6A:
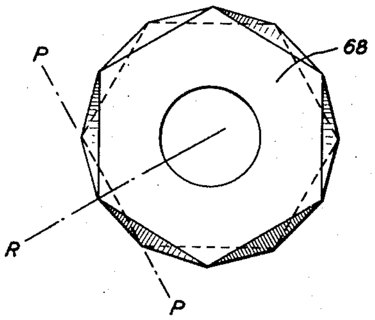
FIGS. 6A and 6B are simplified top and side views, respectively, of a simplified designation plate, selector base, and multifacet plate employed in one embodiment of the invention to stabilize and quantize the designation plate as it is tilted in a first direction.
Figure 6C:
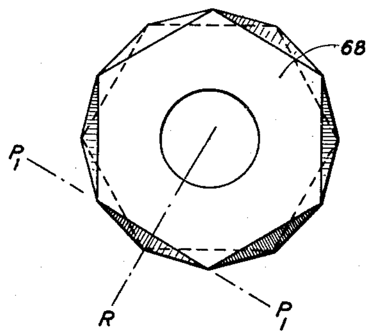
FIGS. 6C and 6D are simplified top and side views, respectively, of a designation plate, base and multifacet plate with the designation plate tilted in a second direction.
Figure 6B:
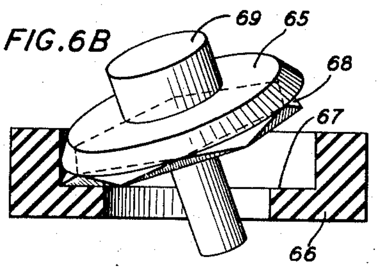
Figure 6D:
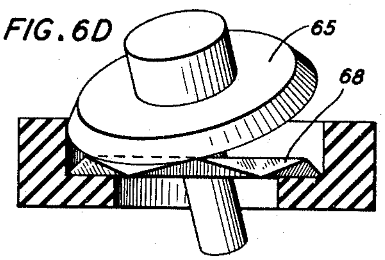

An alternative means for stabilizing and quantizing the motion of the movable designation plate is shown in still another embodiment of the invention in FIGS. 6A–D. In FIGS. 6B and 6D a movable designation plate 65 is shown in simplified form without the numeral-bearing covering which is normally attached to a shank 69 and which carries the push-buttonlike members. It is positioned within a circular recess or well in a base member 66 which corresponds generally to the stationary housing 10 in FIG. 1. To facilitate an understanding of this feature, other mechanical details shown in FIG. 1, for example, have also been omitted. As previously described, pivotal means are employed for supporting the designation plate 65 in a normal position from which it may be tilted in any direction. Plate 65 is restored to its normal position, in the absence of externally applied pressure, by a spring or other resilient means. A conductive disc is affixed beneath the numeral bearing cover attached to shank 69 to contact a selected terminal in a plurality of mutually insulated conducting terminals around the periphery of the upper surface of base member 66. Between the member 65 and a retaining platform 67 at the lower portion of the base, there is provided a circular auxiliary disc or ring 68. This ring illustrated in plan in FIGS. 6A and 6C, whose diameter is substantially less than the diameter of the locus of the buttonlike members, is provided with a number of milled facets on the edges of its upper and lower faces. It contains $$\frac{n}{2}$$

facets on the peripheral edge of its upper face and an equal number on the edge of its lower face, where $n$ is equal to the number of buttons on the designation plate covering 65. The apices of each face lie on the same radii as the mid points of the facets on the opposite face. The upper and lower polygons thus formed are angularly displaced from one another by one $n$th of the arc bearing the numbered buttons, preferably a large fraction of a full circle. The flat faces on the upper side are advantageously centered on even numbered buttons, and the flat faces on the lower side on the odd numbered ones. This auxiliary multifacet ring serves both to quantize and stabilize the angle of tilt in the movable plate in the following manner.

As pressure is applied in a generally downward direction at a point on the periphery of the movable plate, the plate tilts within the well in the base 66 about an axis coincident with that edge of the facet on the auxiliary ring 68 which most nearly lies beneath the point of applied pressure. Should this edge be one defining a facet on the lower face of the ring, the ring assumes a stable position such that only the facet contacts the platform 67. Accordingly, the ring 68 tilts along with the designation plate about the edge PP as illustrated in FIGS. 6A and 6B. Should this edge, to the contrary, be one more nearly above the center of a facet on the upper surface of the ring, the ring 68 remains firmly in contact with the base, i.e., in a horizontal position as shown in FIG. 6D, and the plate 65 tilts about the edge of the facet $P_1P_1$ (shown in FIG. 6C) on the upper rim of the auxiliary ring. In either case a considerable error, up to one-half of the spacing between adjacent numeral positions, made in applying pressure to the plate, nevertheless, produces tilt in the proper direction to firmly and stably engage the desired terminal with no tendency to rock about the tilted position. Rotation of the ring may be prevented by any convenient means, for example, by means of a number of raised pins mounted on the base and a corresponding number of indentations in the ring positioned to accept the pins.

By way of further explaining the function of the auxiliary ring 68, it is helpful to consider the lengths of the various lever arms and the positions of the corresponding fulcrums that produce the tilting action. For pressure applied to a button on a radius centered over a lower facet, the lever arm extends along that radius from the point of applied pressure to the apex lying immediately above it. The fulcrum for this lever is the lower edge PP and the auxiliary ring 68 and plate 65 both tilt about this edge. For pressure applied to a button on a radius centered over an upper facet, the lever arm extends along that radius from the point of applied pressure to the apex lying immediately below it. The fulcrum for this lever is the upper edge $P_1P_1$ and the plate 65 alone tilts about this edge.

The auxiliary ring may, of course, be suitably modified for use with any of the embodiments of the selector herein described.

Figure 7:
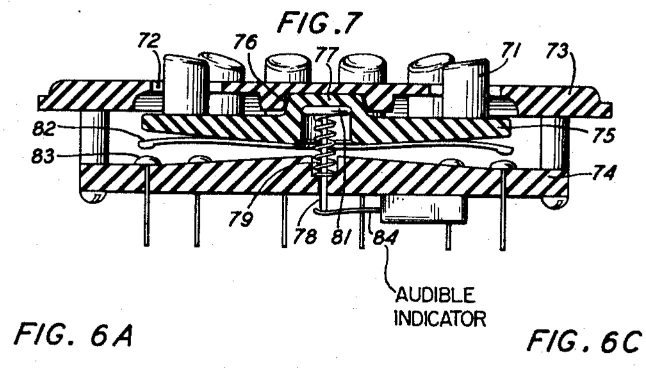
FIG. 7 is a cross-sectional view of an alternative form of circuit selector according to the invention which illustrates the multifunction biasing arrangement for providing both physical and audible indications of the completion of a circuit.

FIG. 7 is a cross-sectional view of a circuit selector embodying many of the features of the invention heretofore described but with the movable portions thereof housed in a slightly different structure from that of the previous drawings. In this form it more realistically represents a type of selector suitable for use in existing modern telephone equipment. The designation plate 75 of the selector of FIG. 7 is also slightly different in form from those previously illustrated but operates according to the same general principle. In this embodiment a series of push-buttonlike bosses 71 are fixed to the upper surface of the movable plate 75 and arranged to extend through a plurality of holes 72 in a cover plate 73 which is in turn affixed to the base member 74. Located on the underside of the plate 73 is a centrally positioned socket 76 into which a protuberance 77 on the movable plate is fitted. Rotation of the movable plate is substantially prevented by the raised boss arrangement while universal tilting is permitted about a pivot point at a juncture of the protuberance 77 and the socket depending on the particular button depressed. The holes 72 in the cover plate, primarily decorative, do not in any way restrict the tilting action of plate 75 but offer protection of the movable parts of the selector from dust and abuse. Additional holes may be provided in the plate to allow voice waves to enter in those cases in which a microphone or receiver unit is mounted coaxially with or behind the selector. Operation of the selector in this form is similar to operation of the previously described selectors. When one of the buttons is depressed the plate tilts about a pivot point established between member 77 and socket 76, and the shaft 78 is forced downward against the resistance of compression spring 79. The shaft is advantageously provided with a suitable bearing surface at its point of engagement with the plate 75 by means, for example, of shoulder member 81. Suitably mounted beneath the plate 75 is a continuous conductor disc 82. The disc may assume a number of forms including, for example, a flexible plate equipped with a suitably enlarged conductor area at its periphery. It is connected to an external circuit through the spring 79. Terminals 83 complete the electrical portions of the switch.

Each embodiment of the invention heretofore described includes means for insuring that one and only one contact is made in response to pressure applied to a portion of a movable designation plate. It is possible, of course, for a subscriber inadvertently to press down on the desired button-like portion with insufficient pressure to effect a contact, similarly, insufficient pressure is likely to produce a partial contact accompanied by a phenomenon best described as chattering. To avoid chattering and to make certain that the operator makes a contact and knows it, it is in accordance with the invention to provide both a physical and an audible indication of the completion of a circuit contact.

This indicator means is illustrated in FIG. 7. It comprises, in its simplest form, a tongue-like cantilever spring member 84 affixed at one end to base 74 and arranged to engage the shaft 78 at the other. It is prestressed either by means of a diaphragm dish formed in the surface of the spring or by means of a mounting which maintains a slightly concave cross-section in the spring. Upon sufficient depression of the shaft against the tension of spring 79, spring member 84 is flexed out of its concave configuration and becomes a simple leaf spring which has a greatly reduced restoring force. The resulting sharp transition from a first rate of displacement for applied force above this point, to a second lesser rate of displacement for the same degree of applied force below this point is accompanied by an audible click similar to that obtained when the spring of a toy "cricket" or breakthrough switch is flexed and released. Both of these indications of the transition are readily discernible to a subscriber. When finger pressure is released and the designation plate is once again restored to its normal resting position, the shaft follows and releases the spring member 84. A second click is produced as the member returns to its rest position and concave configuration. An adjustment may be provided for insuring that both the audible signal and the sharp decrease in displacement rate occur just after the point at which the movable plate is depressed sufficiently to establish a firm contact. While the indicator spring 84 may be positioned so as to be activated directly, through appropriate levers, by the movable plate, the arrangement shown is preferred inasmuch as the indicator may, if desired, be utilized to assume the functions of the spring 79, thereby to serve a dual function and further simplify construction of the selector. Sufficient reciprocating motion of the shaft 78 is attained by providing a second pivoting about an edge of the shoulder member 81 and a corresponding socket in plate 75. Since the shaft 78 is restricted to a simple reciprocating motion, the translation of a point within the socket produced as the plate 75 tilts, produces a substantially greater amount of translation in the shaft.

Figure 8:
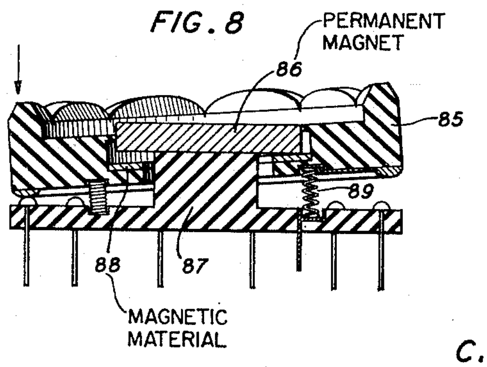
FIG. 8 is a cross-sectional view of a circuit designation selector illustrating another feature of the invention.

FIG. 8 is a cross-sectional view of a movable designation plate illustrating an alternative indicating means in accordance with the invention. Here the biasing means for physically notifying a subscriber that a contact has been established comprises a pair of oppositely poled magnetic members situated respectively in the movable plate 85 and in the circular restraining disc 86 mounted on the triangular pedestal 87. Preferably the entire disc 86 is formed from a permanent magnetic material, and the bearing surface 88 of the movable plate 85 is lined with a ferromagnetic material. As in the selectors previously described, pressure applied to one of the raised portions on the periphery of the movable plate causes the entire plate to tilt about a pivot point located at the junction of the lower edge of disc 86 and a point on the bearing surface 88 of the movable plate 85. In the rest position the plate and disc are held rigidly together both by means of the springs 89 and by the force of attraction between the magnet and the magnetic material. The force-displacement characteristic exhibited by the restoring spring is for the most part a straight line function, that is, in the normal range of operation equal increments of displacement are produced for corresponding increments of applied force throughout the range of travel of the designation plate. The characteristic of the magnetic pair, to the contrary, is nonlinear by virtue of a sharp knee which occurs at the point at which physical contact of the members is lost. Thus, as finger pressure is applied, a substantial degree of resilience is experienced until such time as the bonding effect of the magnet and the magnetic material is overcome. At that point no further restraining force is provided by the magnetic coupling and a sharp reduction in the force necessary to produce additional displacement is produced which is easily discernible. As finger pressure is released, the restoring spring forces the designation plate back toward its upper rest position and magnetic attraction once again locks the plate into its resting position. An audible indication device, as previously described for example, may also be included in this embodiment of the invention. By proper design of the movable plate, the breaking point, i.e., the knee of the force versus displacement curve, is arranged to occur just after the establishment of a firm electrical contact.

The invention in all of the embodiments heretofore described is manifestly suitable for providing separate electrical contacts corresponding to selected designation numerals. An electrical connection of this sort may be used for activating any form of pulse generating equipment thereby to produce for each contact a corresponding series of pulses, or for producing for each contact a tone signal whose frequency identifies a particular contact. Although this form of signalling finds wide application in many forms of endeavor, it is not compatible with the switching apparatus widely used in telephone systems. Another feature of the invention provides for the production of an identifying sequence of current impulses occurring in uniform cadence with one such sequence being produced for each index position.

Figure 9A:
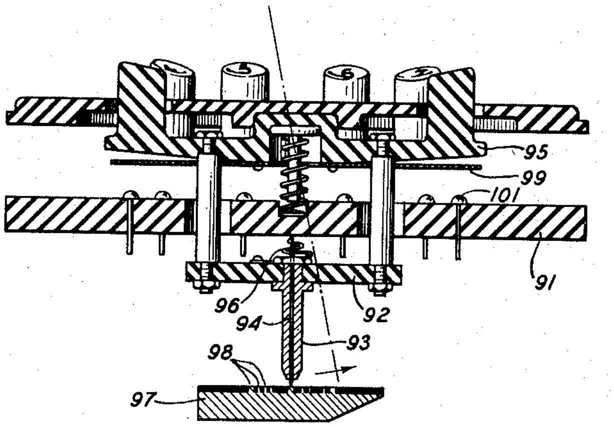
FIG. 9A is a cross-sectional view of a circuit selector according to the invention illustrating the impulse forming device which comprises a feature of the invention.
Figure 9B:
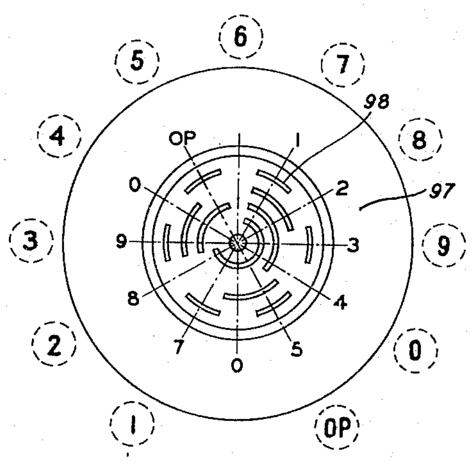
FIG. 9B is a top view of the code disc which forms a part of the impulse forming device of FIG. 9A.

Accordingly, FIG. 9A is a cross-sectional view of circuit selector similar to the one previously illustrated in FIG. 7 in which this feature of the invention is illustrated. Mounted beneath the base member 91 and rigidly affixed to the movable plate 95 is an auxiliary base 92. Any suitable form of mounting may, of course, be employed; the illustration being but one representative form. A downwardly extending stylus support member 93 is rigidly affixed to the base 92 in alignment with an axis extending through the center of the circular plate 95 and perpendicular to the plane of the plate. Extending through a small longitudinal hole in the support member 93 is a metallic stylus 94 which is urged downward by a spring 96. The tip of stylus 94 engages an insulating support plate or disc 97 carrying a series of conductive stripes 98 arranged in any conventional code disc form. Such a disc is illustrated in the plan view of FIG. 9B with corresponding push-button designation numerals indicated at the outer edge of the disc. The stripes 98 may conveniently be oriented in concentric circles on the disc in sectors defined by the push-button positions in such a fashion that the number and order of stripes positioned in any one radius drawn through the corresponding push-button and the center of the disc represents, in any desired code form, an indication of the particular push-button position. Each of the segments is, in a preferred form of the invention, connected together and to an external circuit (not shown) including, for example, a battery and a signalling device. The movable stylus member 94 is connected through the spring 96 to the other side of the battery to complete the electrical circuit.

As any one of the push buttons on the movable plate is depressed thereby tilting the plate, the stylus support 93 swings away from its normal position and describes an arc of a circle centered at the point of pivoting. Consequently, the tip of the stylus 94 is carried radially across the coded disc surface. By virtue of spring 96, the stylus maintains intimate contact with the code disc throughout its sweep across the entire surface of the disc. As pressure is released, the stylus returns to the center of the code disc and in doing so once again engages the several code stripes within the particular path followed.

In both sweeps of the stylus across the disc a plurality of circuit closures is made; the exact number and order being dependent upon the radial path followed. Hence, either the sequence of circuit closures produced in the outward sweep or in the return sweep, or both, may be utilized depending upon the complexity of the code employed and the number of index positions accommodated by the selector. In a preferred mode of operation, only the return sequence is utilized. Accordingly, a circuit including a switch comprising the conductor disc 99 and one of the terminals 101 is used to derive, prior to the initiation of the return sweep, an enabling pulse. Thus, as a push button is depressed, the stylus sweeps outward but the circuit closures produced thereby are idle. As soon as sufficient pressure is applied to tilt the stylus assembly to its outwardly most disposed position, the disc 99 contacts one of the terminals 101. From this contact an enabling pulse is produced which establishes the desired circuit so that the sequence of circuit closures produced by the return swing of the stylus assembly across the disc may be accepted for use. As an alternative, a continuous conductor ring may be included in the code disc at its outer extremity to provide an enabling pulse upon engagement with the stylus. Similarly, engagement of the stylus with an inner circle of conductive material may be used as a turn-off pulse to disconnect the circuit during the next outward swing of the stylus. If this sort of enabling system is used, and it is entirely a matter of choice, the disc 99 and the terminals 101 may be used either for an auxiliary function or as a simultaneous source of circuit closures.

An important advantage of this arrangement is that the selector may be used directly in existing telephone equipment and neither external multifrequency generators nor electromechanical pulse generators are required and bulky relays or vibratory mechanisms need not be included in the selector mechanism itself. Moreover, by appropriately arranging the conductor elements over substantial segments of the code disc, an additional quantizing effect is achieved which further increases the probability of the correct selection of the desired circuit.

The code disc has been described as comprising an insulating disc having a number of conductive stripes embedded therein, but it is to be understood that a conductive disc with insulating ridges or apertures may equally well be used provided only that corresponding changes be made in the external circuit. Similarly, indentations or risers may be employed to impart a reciprocating motion to the stylus thereby to sequentially close an external circuit.

While the invention has been described primarily in the context of telephone switching apparatus, it may, of course, be advantageously employed whenever and wherever one of a number of possible circuit closures need be made in direct correspondence to a corresponding number of index numerals. Accordingly, many applications and variations in the structure described, and its mode of operations, will occur to those skilled in the art.

What is claimed is:

1. A designation transmitter comprising a bed plate, a plurality of mutually insulated electrical terminals mounted in a circular arrangement on said bed plate, an operating member bearing on its outer surface a plurality of marked bosses designating corresponding electrical circuits, means operatively connected to said bed plate for pivotally supporting said operating member in a normal position from which it may be tilted in any direction, a conductor disc having a radius approximating the radius of said circular arrangement of terminals, said disc being affixed to said operating member for engaging at least one of said terminals whenever said operating member is tilted in any direction, and means cooperating with said bosses and responsive to the application of pressure to a selected one of said bosses for quantizing the tilt of said operating member to one of a plurality of discrete angles.

2. A designation transmitter comprising a bed plate, a plurality of mutually insulated electrical terminals mounted in a circular arrangement on said bed plate, each of said terminals being associated with an external electrical circuit, a circular operating member bearing on its upper peripheral surface a plurality of marked bosses, each of which corresponds respectively to one of said circuits, means connected to said bed plate for pivotally supporting said operating member in a normal position from which it may be tilted in any direction in response to finger pressure applied to a selected one of said bosses, a conductor disc having a radius approximating the radius of said circular arrangement of terminals, said disc being affixed to said operating member for engaging one of said terminals whenever said operating member is tilted in one selected direction, and means cooperating with said bosses for quantizing the tilt orientation axis of said operating member in response to pressure applied to any point of the periphery of said operating member whereby pressure applied closer to the center of one of said bosses than to the center of any other of said bosses produces tilt in the selected direction to engage the corresponding terminal and to effect the circuit corresponding to said closer boss.

3. In combination with a designation transmitter as defined in claim 2, means cooperating with said disc for stabilizing the tilt of said operating member once it has been so far tilted as to engage one of said electrical terminals despite an error in the point of application of said pressure.

4. In combination with a designation transmitter as defined in claim 2, means responsive to deflections of said operating member for indicating a degree of tilt of said member sufficient to produce a firm engagement of said conductor disc with at least one of said terminals.

5. The designation transmitter as defined in claim 4 wherein said indicating means comprises a prestressed cantilever spring member fixed to said bed plate and maintained in a concave cross-section configuration, and means associated with said operating member for flexing said spring out of its concave configuration each time said operating member is tilted sufficiently to effect a contact between said conductor disc and one of said terminals.

6. The designation transmitter as defined in claim 2 wherein magnetic elements are fixed to said operating member and to said bed plate in juxtaposition whereby the force of attraction between the two maintains said operating member in its normal position in the absence of applied pressure.

7. A circuit selector which comprises a bed plate, a vertical shaft fixed to said bed plate and extending upwardly therefrom, a plurality of mutually insulated conducting pins fixed to said plate and arranged in a circle about the shaft, a disc pivotally mounted on said shaft in a normal position from which it may be freely tilted in any direction, said disc having affixed to its underside a conductor coextensive with said circle, spring means associated with said shaft for maintaining said disc in a normal position, said disc bearing on its upper surface a plurality of marked bosses, each designating a particular circuit connection to be made by tilting said disc into engagement of said conductor with said pins, means cooperating with said bosses and responsive to the application of finger pressure to a selected one of said bosses for quantizing the tilt of said disc to one of a plurality of discrete angles from said normal position, and means cooperating with said disc for stabilizing said tilt at said angle despite an error in the point of application of said finger pressure.

8. A circuit selector as defined in claim 7 having means cooperating with said disc and comprising a plurality of insulating members mounted on said bed plate in alternate relationship with said conducting pins.

9. A circuit selector comprising a stationary housing member, a circular operating member having *n* designation marks spaced along the periphery thereof, pivotal means for supporting said operating member in a normal position within said housing member from which it may be tilted in any direction, resilient means for restoring said operating member to its normal position, a plurality of mutually insulated conducting terminals fixed to said stationary housing and arranged in juxtaposition to said designation marks on said operating member, a conductor disc affixed to said member so disposed that when said member is tilted in any direction it engages at least one of said terminals, a circular plate positioned between said stationary housing and said operating member, said plate bearing $$\frac{n}{2}$$

milled facets on the periperal dege of one of its faces and $$\frac{n}{2}$$

milled facets on the peripheral edge of its other face, the apices of each face lying on the same radii as the midpoints of the facets on the other face, one of said designation marks being centered on each one of said milled facets such that for pressure applied nearer to a designation mark centered on one of said facets on the upper face of said plate than to any other, said operating member pivots about the edge of said upper facet, and for pressure applied nearer to a designation mark centered on one of said facets on the lower face than to any other, said operating member pivots about the edge of said lower facet, and means responsive to pressure applied to any one of said designation marks on said operating member for establishing a corresponding electrical circuit.

10. An impulse transmitting device which comprises a bed plate, a vertical shaft tiltably fixed to said bed plate, a plurality of mutually insulated conducting pins fixed to said bed plate and arranged in a circle about said shaft, a circular operating member fixed on said shaft and bearing on its underside a conductor disc co-extensive with said circle, said operating member bearing on its upper surface a plurality of marked bosses, each designating a particular sequence of impulses to be generated by tilting said operating member in a direction defined by said marked bosses, a circular code plate member bearing serrated concentric rings of conductive material to form in each of selected radial directions a coded sequence of conductive areas and insulating areas, said selected radial directions corresponding respectively to said marked bosses, a conducting stylus resiliently fixed to said vertical shaft and disposed to engage the several conductive rings on said code plate member as said shaft tilts in response to pressure applied to said operating member, means for directing the tilt of said operating member in response to the application of finger pressure to a selected one of said bosses to one of a plurality of discrete angles, means for stabilizing said tilt at said angle despite an error in the point of application of said finger pressure, and electrical circuit means including said stylus and said conductive rings for deriving upon each tilt of said operating member in response to pressure applied to a selected one of said marked bosses, a sequence of intermittent engagements of said stylus with those conductive rings on said code plate member positioned in the radial sector defined by the selected marked boss to which pressure is applied, thereby to produce a sequence of electrical impulses.

11. In combination with the impulse transmitting device defined in claim 10, means for indicating the measure of pressure applied to a selected one of said marked bosses on the upper surface of said operating member sufficient to produce a firm engagement of said conductor disc with at least one of said conducting pins thereby to insure that a full sequence of electrical impulses is produced.

12. The impulse transmitting device as defined in claim 10 wherein said sequence of electrical impulses is derived upon the return of said operating member to its normal position following the release of pressure applied to a selected one of said marked bosses.

References Cited in the file of this patent

UNITED STATES PATENTS

| | | |
|---|---|---|
| 1,850,769 | Porsche | Mar. 22, 1932 |
| 1,980,803 | Whoram | May 16, 1933 |
| 2,190,307 | Bascom | Feb. 13, 1940 |
| 2,227,350 | Kight | Dec. 31, 1940 |
| 2,410,050 | Deakin | Oct. 29, 1946 |
| 2,686,234 | Obszarny | Aug. 10, 1954 |
| 2,863,010 | Riedl | Dec. 2, 1958 |